D. McF. MOORE.
PHOTOMETER.
APPLICATION FILED APR. 7, 1906.
994,329.
Patented June 6, 1911.
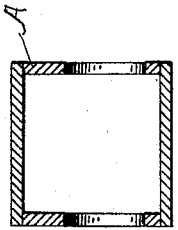
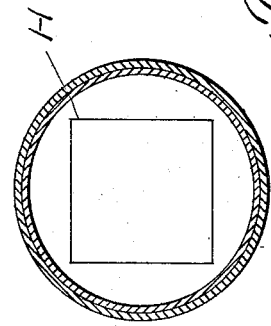
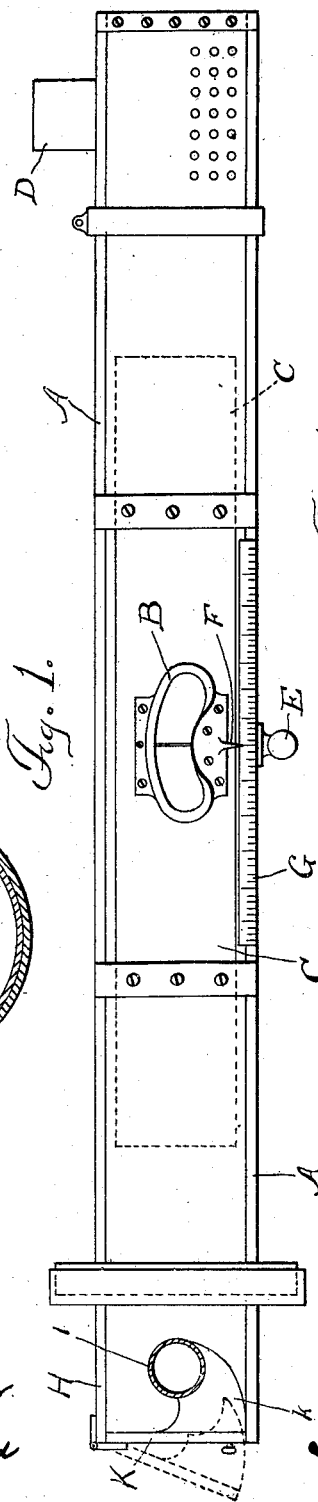
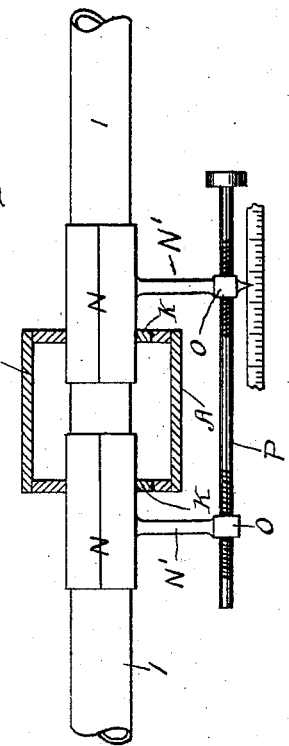
WITNESSES:
INVENTOR
Daniel McFarlan Moore.
BY
Townsend & Decker
ATTORNEYS

UNITED STATES PATENT OFFICE.

DANIEL McFARLAN MOORE, OF NEWARK, NEW JERSEY, ASSIGNOR TO MOORE ELECTRICAL COMPANY, OF NEW YORK, N. Y., A CORPORATION OF NEW YORK.

PHOTOMETER.

994,329. Specification of Letters Patent. Patented June 6, 1911.

Application filed April 7, 1906. Serial No. 310,409.

*To all whom it may concern:*

Be it known that I, DANIEL McFARLAN MOORE, a citizen of the United States, and a resident of Newark, in the county of Essex and State of New Jersey, with post-office address 52 Lawrence street, have invented certain new and useful Improvements in Photometers, of which the following is a specification.

My invention relates to the construction of photometers and more particularly to that class of photometers in which the intensity of the light to be measured is ascertained by comparing the same with a source of light of standard intensity.

The invention may be applied to photometers of that type in which the comparison is made by moving the illuminated screen or object along a line between the light to be measured and the standard light or to any other style of photometer suitable for permitting the desired comparison to be made and the value of the light to be ascertained or read from the proper scale.

The object of my present invention is to provide a convenient portable apparatus that may be readily employed for ascertaining the illuminating power of electric lights of that class in which the source of illumination is a gas or vapor contained in a translucent tube.

A further object is to permit the intensity of the light to be measured without removing the tube from the position in which it is installed.

To these ends my invention consists substantially of a portable photometer tube or box provided at one end with means for holding a standard source of light, such for instance, as an amyl acetate lamp and at the other with a suitable opening whereby it may be slipped upon the tube sidewise thereof. Preferably, such opening is of a form to permit the box to be hooked, as it were, upon the tube so as to be in a measure supported thereby.

My invention consists further in so constructing or mounting the end portion of the box in which the transverse opening is located that it shall be capable of rotation in a plane transverse to the longitudinal axis of the box so that the instrument may be readily applied to tubes occupying a horizontal or vertical position or any intermediate position without making it necessary to bring the scale and observation opening in the box into position inconvenient for use.

My invention consists further in a novel construction of photometer for measuring the intensity of light in vacuum tubes and comprises essentially an opaque tubular or sleeve-like shield adapted to surround a section of the tube, means for moving said shield axially along the tube to vary the extent of exposure while the same is maintained in fixed relation to an object illuminated by said section of tubing and by a light of standard intensity, and a scale and index connected with the movable shield and graduated to the desired standard of comparison.

My invention consists also in details of construction hereinafter more particularly described and then specified in the claims.

In the accompanying drawings, Figure 1 is a side elevation of a photometer box embodying my invention, the end section or portion that is applied to the light tube being shown in partial section. Fig. 2 is a cross section on the line of junction of the main portion of the box with the adjustable end section. Fig. 3 is a transverse section through the box on the line of the opening which receives the light tube. Fig. 4 is a sectional end view of an improved construction of photometer in which a movable shield or shields encircling the tube are employed.

A indicates a box or tube of any suitable form in cross section. Said box may be square, but is preferably circular in cross section at one end which received the light tube, so that the end section of the box may be readily turned into any position according to the position occupied by the portion of tubing whose light is to be measured. The interior of said box is preferably provided with a dark lining and at one end of the box is located the usual chimney D adapted to carry away the products of combustion from the standard lamp which is located beneath said chimney and is introduced into the box through an end opening or other suitable opening. At the central portion of the box is provided the observation opening B by which the illuminated object may be seen. Said opening B is provided in a slide C forming a sliding side section sufficient to cover the side of the box in any position of longitudinal adjustment and carrying, as usual in the art, the illuminated screen with a spot as in a Bunsen photometer. Connected also to said support is a knob E by which the parts may be adjusted along the longitudinal axis of the box, and an index or pointer F by which readings may be taken from a stationary direct reading photometric scale G. This connection being of the usual character in photometers is not shown in detail. Other types of photometer might be used in place of the Bunsen type without departing from my invention.

In the end portion H of the box is provided a circular opening transverse to the longitudinal axis and adapted to receive a tube $l$ which is the light-giving tube the intensity of whose light is to be measured. Ordinarily it is desirable to compare the illuminating power of such tubes per foot of length and such end section H is, in such case, of sufficient size to permit a foot of tubing to be exposed within the box. The opening extending from side to side of the end section H communicates with any suitable opening in the end portion of the box as shown so that the end of the photometer box may be readily slipped over the tubing by presenting the box to the tube in the direction of the longitudinal axis of the box.

When an opening of the form shown is provided, the end of the section H is provided with a hinged cover K which has suitable wings $k$ adapted to close the slots or openings through which the tube $l$ is introduced into position. These wings and the cover K close the end portion against the entrance of extraneous light. The opening in which the tube $l$ is received fits the same closely. As will be obvious, other arrangements might be employed for introducing the tube into position. Preferably the end section H is made detachable. It is also so connected to the body of the box A as to be capable of being turned in a plane transverse to the longitudinal axis of the box so as to accommodate itself to different positions of the tube whose light is to be measured. This adjustment may be secured by constructing the end section H so as to telescope into or over the end portion of the box or tube proper A, the manner of connection being illustrated in Fig. 2. This permits the end section to be turned in a plane transverse to the longitudinal axis of the main portion of the box. For this purpose the square end section is made to terminate at its inner end in an enlarged circular or collar shaped part which may slip on over an enlarged circular portion on the end of the box A just as the cover of a round box slips on over the mouth thereof as seen in the side elevation Fig. 1. As will be seen, the tube itself, when lying in a horizontal position, affords a support for the end of the photometer box, thus making it easy for the user to apply the device and take an observation. Obviously, the disposition of the opening and the construction of the end portion H together with the means for cutting off extraneous light when the tube is in position might be varied without departing from my invention.

Fig. 4 illustrates a modification which makes it permissible to dispense with the movable slide C and to have the same fixed in position with relation to the tube and the standard light. In this case the use of the index or pointer for taking readings from a stationary photometric scale over which the pointer is shifted by moving the illuminated object is dispensed with.

N indicates two opaque sleeve or screens, each made preferably in two longitudinal sections adapted to be clasped around the tube. Said screens or shields are moved longitudinally along the tube and their opposed ends are located within the box or casing A. By moving one or both of them, it is obvious that the length of the exposed section of tubing may be adjusted and thereby the amount of illumination from the vacuum tube to which the object is exposed, may be varied. This enables the comparison to be made without moving the illuminated object which obviously, during such comparison, is exposed at the same time to illumination from the source of standard intensity. The readings are obtained by devices suitably connected with the mechanism for moving the shield or shields N. The latter are, of course, made of opaque material. Each may be supported upon a standard N' terminating in a nut O. Through said nuts passes screw shaft P having reversed screws engaging respectively the nuts O, thereby producing, from rotation of the shaft P, a simultaneous approach or recession of the opposed ends of the shields N to or from one another. Obviously one of said shields might be dispensed with without departing from my invention. The pointer or index may be carried by one of the nuts or by the standards connected therewith and may move over a suitable scale graduated and calibrated in any desired manner.

What I claim as my invention is:

1. A portable photometer box, one end of which is provided with a transverse opening extending across the same from side to side and adapted to receive and fit around a section of electric light tube, as and for the purpose described.

2. A photometer box or tube having an end section provided with a transverse opening adapted to receive a section of light tube and adjustable around an axis in a plane transverse to the longitudinal axis of the main portion of the box, as and for the purpose described.

3. A photometer box provided at one end with a transverse opening adapted to receive and fit around a section of light tubing, and with connecting slots or openings through which the tube may be introduced into position and means for closing said slots against extraneous light.

4. The combination in a photometer for measuring the intensity of light in vacuum tubes, of an opaque tubular or sleeve-like shield adapted to surround a section of the tube, means for moving said shield axially along the tube to vary the extent of exposure while the same is maintained in fixed relation to an object illuminated by said section of tubing and by a light of standard intensity, and a scale and index connected with the movable shield and graduated to the desired standard of comparison.

5. The combination in a photometer for measuring the intensity of light in vacuum tubes, of a shield, means for moving the shield axially along the tube to vary the extent of exposure while the same is maintained in fixed relation to an object illuminated by said section of tubing and by a light of standard intensity, and a scale and index connected with the movable shield and graduated to the desired standard of comparison.

Signed at New York in the county of New York and State of New York this 30th day of March A. D. 1906.

DANIEL McFARLAN MOORE.

Witnesses:
C. F. FISCHNER, Jr.,
LILLIAN BLOND.

Copies of this patent may be obtained for five cents each, by addressing the "Commissioner of Patents, Washington, D. C."